(12) United States Patent
Yasuda et al.

(10) Patent No.: US 8,883,263 B2
(45) Date of Patent: Nov. 11, 2014

(54) COATED FILM MANUFACTURING METHOD AND COATING MACHINE

(75) Inventors: Kenichi Yasuda, Kanagawa (JP); Kimio Yukawa, Kanagawa (JP); Ryousuke Shimizu, Kanagawa (JP); Noriaki Horikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 13/282,033

(22) Filed: Oct. 26, 2011

(65) Prior Publication Data

US 2012/0100294 A1    Apr. 26, 2012

(30) Foreign Application Priority Data

Oct. 26, 2010 (JP) ................ P2010-240007

(51) Int. Cl.
| | | |
|---|---|---|
| C23C 14/00 | (2006.01) | |
| B05C 11/02 | (2006.01) | |
| B05D 3/12 | (2006.01) | |
| B05D 3/02 | (2006.01) | |
| B05D 7/04 | (2006.01) | |
| B29D 11/00 | (2006.01) | |
| B05D 1/26 | (2006.01) | |
| B05C 11/10 | (2006.01) | |
| B05C 5/02 | (2006.01) | |
| G02B 1/11 | (2006.01) | |
| G02B 5/30 | (2006.01) | |
| B05D 3/06 | (2006.01) | |

(52) U.S. Cl.
CPC .......... *B05C 5/0283* (2013.01); *G02B 1/11* (2013.01); *B05D 3/0209* (2013.01); *G02B 5/3083* (2013.01); *B05D 7/04* (2013.01); *B29D 11/00788* (2013.01); *B29D 11/00903* (2013.01); *B05D 1/26* (2013.01); *B05C 11/1039* (2013.01); *B05D 3/0254* (2013.01); *B05D 3/067* (2013.01); *B05D 2252/02* (2013.01)
USPC ............... 427/356; 118/50; 118/125

(58) Field of Classification Search
CPC ...... B05C 11/1039; B05C 5/028; B05D 1/26; B05D 2252/02; B05D 3/0209

USPC .............................. 427/356; 118/50
See application file for complete search history.

(56) References Cited

U.S. PATENT DOCUMENTS

| 6,585,824 B2 * | 7/2003 | Katagiri et al. ............... 118/698 |
|---|---|---|
| 7,092,855 B2 * | 8/2006 | Wyatt et al. ........................ 703/1 |
| 2001/0004422 A1 * | 6/2001 | Maruyama et al. ........... 396/604 |
| 2007/0178311 A1 * | 8/2007 | Akagi ........................ 428/411.1 |

FOREIGN PATENT DOCUMENTS

| JP | 5-4066 A | 1/1993 |
|---|---|---|
| JP | 2005-270878 A | 10/2005 |
| JP | 2005270878 A * | 10/2005 |

OTHER PUBLICATIONS

Notice of Reasons for Rejection, dated Sep. 27, 2012, for Japanese Application No. 2010-240007, including an English translation.

* cited by examiner

*Primary Examiner* — Dah-Wei D Yuan
*Assistant Examiner* — Kristen A Dagenais
(74) *Attorney, Agent, or Firm* — Birch, Stewart, Kolasch & Birch, LLP

(57) ABSTRACT

A coated film manufacturing method and a coating machine are provided which can prevent deformation of a die coater due to evaporation of a coating liquid and prevent surface deficiency occurring when starting the coating. A coating machine is prepared which includes a die coater having a manifold, a slot communicating with the manifold, and a lip face formed at an end of the slot, a heat-insulating plate being disposed in a region below the lip face of the die coater and having a tapered top end portion, and a depressurizing chamber being disposed upstream in a web conveying direction from the die coater. The coating machine is made to stand by at a position for forming a clearance greater than a predetermined clearance between the coating machine and the web at the time of coating while flowing the coating liquid from the die coater.

14 Claims, 7 Drawing Sheets

COATED FILM MANUFACTURING METHOD AND COATING MACHINE

BACKGROUND OF THE INVENTION

1. Field of the Invention

The present invention relates to a coated film manufacturing method and a coating machine.

2. Description of the Related Art

In manufacturing a coated film such as an optical film, a coating liquid is supplied to a continuously-traveling web by a die coater. In recent years, a technique of forming a precise coat with a thinner wet thickness is required to exhibit a desired function.

In order to form a precise coat with a thinner thickness, it is necessary to reduce the clearance between a die coater and a web and to maintain the clearance with high accuracy. However, even when the clearance between the die coater and the web is positioned with high accuracy, the die coater may be deformed due to a variation in temperature of the die coater. Accordingly, there is a problem in that the accuracy of the set clearance cannot be maintained.

To solve this problem, JP1993-004066A (JP-H05-004066A) discloses a coating machine in which heat-retention water is circulated in a die coater and the entire die coater is coated with a heat-insulating material.

When a coating liquid adheres to the die coater and an organic solvent in the coating liquid is evaporated, heat is released from the die coater. Accordingly, the temperature of the die coater varies and thus the die coater is deformed. Particularly, in a standby state before coating, the coating liquid is made to flow from the die coater until the supply of the coating liquid is stabilized. Accordingly, the evaporation is large and the deformation due to the variation in temperature of the die coater is particular noted.

To solve this problem, JP2005-270878A discloses a technique of preventing a coating liquid from coming in contact with a die coater by attaching a heat-insulating plate to a part of the outer circumference of the die coater or coating the part of the outer circumference of the die coater with a heat-insulating material.

SUMMARY OF THE INVENTION

When a plate is attached to the die coater, it is necessary to surely press and fix the plate to the die coater. This is intended to prevent the deformation of the die coater due to the flowing of the coating liquid into a gap between the plate and the die coater. For this purpose, the plate should have a certain thickness. When the plate is attached to the die coater with a screw, the head of the screw protrudes from the plate.

In this case, when the coating liquid is made to flow from the die coater in a standby state, a reservoir can be easily formed in the top end portion of the plate or the head of the screw. When the supply of the coating liquid is started from the die coater to a web in this state, the reservoir is scattered in a depressurizing chamber disposed upstream from the die coater. As a result, an unintentional coating liquid can be easily adhered to the continuously-traveling web, thereby causing surface deficiency. A surface deficiency means a defect that a uniform coat is not formed. However, JP1993-004066A (JP-H05-004066A) and JP2005-270878A do not describe or teach the surface deficiency due to the formation and scattering of the reservoir.

The present invention has been made in view of the above-mentioned problems and an object of the present invention is to provide a coated film manufacturing method and a coating machine which can prevent deformation of a die coater due to evaporation of a coating liquid and prevent surface deficiency occurring when starting the coating.

According to an aspect of the present invention, there is provided a coated film manufacturing method of supplying a coating liquid to a continuously-traveling web and manufacturing a coated film, preventing the coating liquid from being attached to the region below the lip face of the die coater, the method including: a step of preparing a coating machine including (a) a die coater having a manifold to be supplied with the coating liquid, a slot communicating with the manifold, and a lip face formed at an end of the slot, (b) a heat-insulating plate being disposed in a region below the lip face of the die coater and having a top end portion in which the thickness of the heat-insulating plate gradually decreases upward, and (c) a depressurizing chamber being disposed upstream in a web conveying direction from the die coater; a step of causing the coating machine to stand by at a position for forming a clearance greater than a predetermined clearance between the coating machine and the web at the time of coating while flowing the coating liquid from the die coater; and a step of causing the coating machine to move to a position for forming the predetermined clearance, forming a bead between the web and the die coater, and supplying the coating liquid to the web to form a coat.

According to this aspect of the present invention, it is possible to prevent the deformation of the die coater due to the variation in temperature based on evaporation of the coating liquid and to make the thickness distribution of the coat uniform. When starting the coating, it is possible to suppress the surface deficiency due to the scattering of a reservoir, thereby forming a highly-precise coat.

Here, "preventing the coating liquid from being attached to the region below the lip face of the die coater" means to suppress the deformation of the die coater due to the evaporation of the coating liquid within 10 μm in the width direction, preferably within 5 μm, and more preferably within 3 μm and to suppress the contact of the coating liquid with the die coater. Therefore, the above-mentioned phrase includes a case where the coating liquid does not become attached to the die coater and a case where the coating liquid is attached to the die coater as long as the deformation of the die coater is within the above-mentioned range. Downward means towards a side to which the coating liquid flowed from the die coater at the position for forming a clearance larger than the predetermined clearance from the web flows and upwards means the opposite of the downward.

In the coated film manufacturing method, the top end portion of the plate preferably has a tapered shape. By employing this configuration, the reservoir of the coating liquid is not formed. Here, when the reservoir of the coating liquid is not formed, it means that such a reservoir to be scattered into the depressurizing chamber is not formed.

In the coated film manufacturing method according to the aspect, it is preferable that the plate has a convex portion, the die coater has a concave portion locked to the convex portion, and the plate is fixed to the die coater by inserting the convex portion into the concave portion. By forming the convex portion in the plate, it is easy to fix the plate to the die coater. The formation of the convex portion does not cause the reservoir of the coating liquid, which is preferable. Since the plate can be fixed to the die coater without using a fixing member, it is possible to suppress an increase in cost of the coating machine.

In the coated film manufacturing method according to the aspect, it is preferable that the plate is fixed to the die coater by the use of a fixing member fixing the plate to the die coater and the fixing member has a shape that does not protrude from the plate after the plate is fixed to the die coater. Here, the fixation of the fixing member so as not to protrude from the plate means that the fixing member is fixed without substantially protruding so as not to form a reservoir of the coating liquid. At this time, it is preferable that the fixing member has such a shape to form a flat surface along with the plate after the plate is fixed to the die coater. By forming the flat surface, it is possible to suppress the formation of a reservoir.

In the coated film manufacturing method according to the aspect, it is preferable that the plate has a diameter reduction hole, the die coater has a concave portion, and the fixing member has such a shape to be inserted into the hole and the concave portion to fix the plate to the die coater.

In the aspect of the present invention, examples of the fixing member used to fix the plate to the die coater include a screw, a bolt, a snap pin, and a hook-and-loop fastener.

In the coated film manufacturing method according to the aspect, it is preferable that the plate has a modulus of rigidity of 10 GPa to 100 GPa.

In the coated film manufacturing method according to the aspect, it is preferable that the plate includes at least a first plate having a heat-insulating property and a second plate having a modulus of rigidity higher than that of the first plate.

In the coated film manufacturing method according to the aspect, it is preferable that the die coater is an extruding die coater.

In the coated film manufacturing method according to the aspect, it is preferable that the die coater is a sliding die coater.

In the coated film manufacturing method according to the aspect, it is preferable that the wet thickness of the coat is in the range of 0.1 µm to 10 µm.

In the coated film manufacturing method according to the aspect, it is preferable that the web is conveyed at a speed of 20 m/min or higher.

The coated film manufacturing method according to the aspect preferably further includes a step of drying the coat to solidify the coat.

According to another aspect of the present invention, there is provided a coating machine including: a die coater having a manifold to be supplied with a coating liquid, a slot communicating with the manifold, and a lip face formed at an end of the slot; a heat-insulating plate being attached to the die coater so that the coating liquid flowed from the die coater is not attached to a region below the lip face of the die coater and having a top end portion in which the thickness of the heat-insulating plate gradually decreases upward; and a depressurizing chamber being disposed upstream in a web conveying direction from the die coater.

In the coated film manufacturing method and the coating machine according to the aspects of the present invention, it is possible to prevent the deformation of the die coater due to a variation in temperature based on evaporation of a coating liquid and to make a coat thickness distribution uniform. It is also possible to suppress surface deficiency due to scattering of a reservoir and to form a highly-precise coat when starting the coating.

DESCRIPTION OF THE PREFERRED EMBODIMENTS

Hereinafter, preferred embodiments of the present invention will be described with reference to the accompanying drawings. The present invention will be described with reference to the preferred embodiments, but can be modified in various forms without departing from the scope of the present invention. Accordingly, embodiments other than these embodiments may be used. Therefore, all the modifications within the scope of the present invention are included in the claims.

Figure 1:
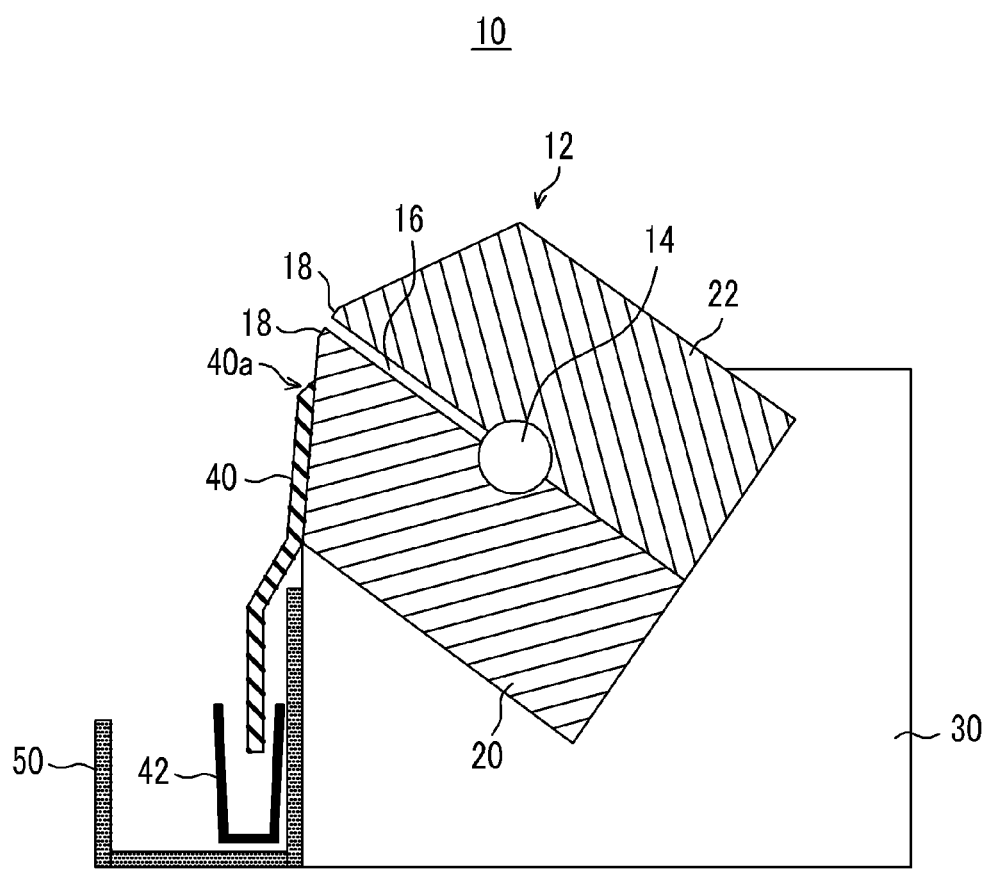
FIG. 1 is a diagram schematically illustrating the configuration of a coating machine according to an embodiment of the present invention.

FIG. 1 shows a sectional view of a coating machine. The coating machine 10 includes an extruding die coater 12, a trestle 30 supporting the die coater 12, a heat-insulating plate 40 attached to the die coater 12, and a depressurizing chamber 50 disposed adjacent to the die coater 12.

Regarding positions, the direction in which a web is conveyed from a certain reference point is referred to as "towards downstream" or "downstream" and the direction opposite to the direction in which the web is conveyed from a certain reference point is referred to as "towards upstream" or "upstream". The direction of the web perpendicular to the web conveying direction is referred to as a "web width direction".

The die coater 12 includes a manifold 14 disposed in a main body and a slot 16 communicating with the manifold 14. A lip face 18 is formed at an end of the slot 16. In the extruding die coater 12, a bead is formed between a coating liquid flowed from the slot 16 and the web and the coating liquid is supplied to the web. The die coater 12 includes two blocks of an upstream die block 20 and a downstream die block 22. The manifold 14 and the slot 16 are formed by disposing the upstream die block 20 and the downstream die block 22 having a cavity to face each other. In this way, by setting the die coater 12 to a multi-block structure, it is possible to enhance the processing precision of the die coater 12. The upstream die block 20 and the downstream die block 22 are formed of a material such as high-rigidity SUS. Such a material is used for the reason of high corrosion resistance and high processing precision. The upstream die block 20 and the downstream die block 22 may be formed in a body.

A coating liquid is gathered in the manifold 14 of the die coater 12 so as to diffuse the supplied coating liquid in the coating width direction (the web width direction). In the manifold 14 according to this embodiment has a sectional shape such as a circular shape, an elliptical shape, a semi-circular shape, a substantially semi-circular shape, a trapezoidal shape, and a substantially trapezoidal shape. The manifold 14 forms a hollow portion having a substantially constant sectional shape in the web width direction.

The shape of the lip face 18 is appropriately selected depending on the conditions such as the type of a coating liquid and the thickness of a coat to be formed on the web. The shape or size of the lip face 18 may be different between the upstream die block 20 and the downstream die block.

A heat-insulating plate 40 is fixed to the vicinity of the lip face 18 of the upstream die block 20. The plate 40 has a length substantially equal to the length in the width direction of the die coater 12. The plate 40 prevents the coating liquid flowed from the slot 16 form coming in contact with the upstream die block 20. That is, the contact area between the coating liquid and the upstream die block 20 can be reduced. The plate 40 has a heat-insulating property. Therefore, even when an organic solvent of the coating liquid attached to the plate 40 is evaporated, it is possible to prevent heat from being released from the upstream die block 20 by the use of the plate 40. Accordingly, it is possible to suppress the variation in temperature of the die coater 12.

The plate 40 has a tapered shape in a top end portion 40a thereof. The top end portion 40a of the plate 40 indicates a portion of the plate 40 close to the lip face 18. The tapered shape is formed so that the thickness of the plate 40 is gradually reduced towards the top end portion 40a and the upstream die block 20. The coating liquid flowing from the lip face 18 to the top end portion 40a of the plate 40 flows to the bottom end portion of the plate 40 along the tapered shape. Therefore, the reservoir of the coating liquid is not formed in the top end portion 40a of the plate 40.

The plate 40 is formed of a material such as a polyether ether ketone resin and has a thickness in the range of 1 to 5 mm. The plate 40 is fixed to the upstream die block 20, for example, with an adhesive.

The plate 40 further extends downward over the upstream die block 20. A container 42 is disposed in the bottom end portion of the plate 40. The container 42 recovers the coating liquid flowing along the plate 40. The container 42 is disposed in a depressurizing chamber 50.

The depressurizing chamber 50 is disposed upstream from the die coater 12. To stabilize the bead state of the coating liquid formed between the web and the die coater 12, the depressurizing chamber 50 maintains the pressure around the bead in an ideal state.

Figure 2:
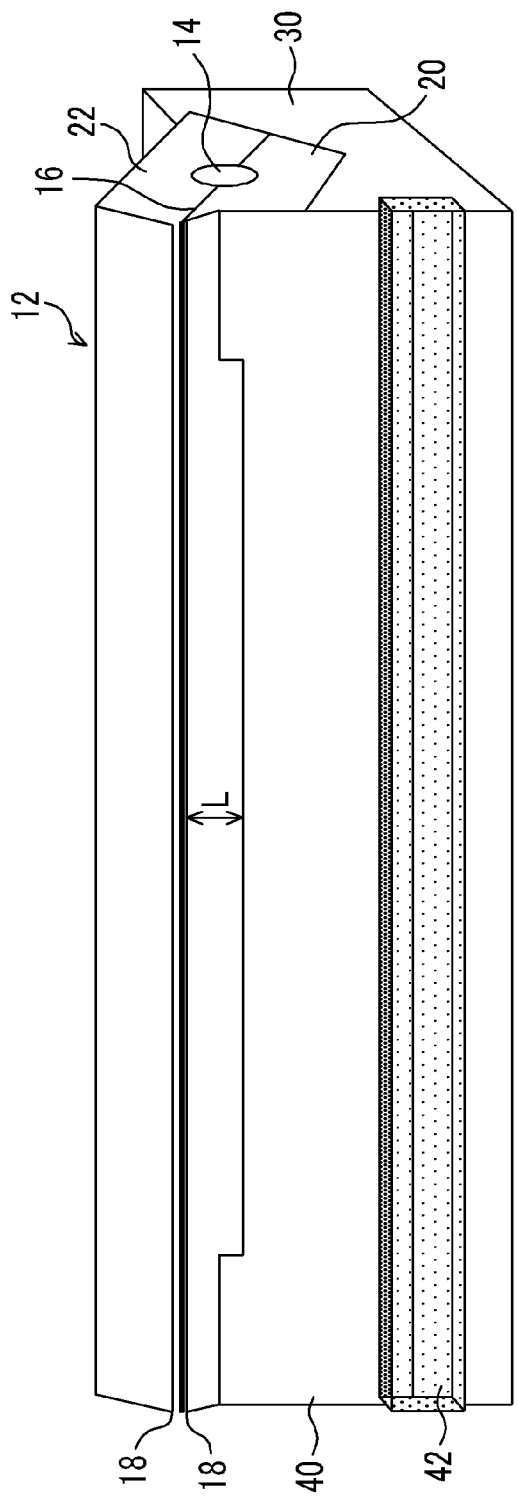
FIG. 2 is a perspective view of the coating machine.

FIG. 2 shows a perspective view of the coating machine. Here, the depressurizing chamber is not shown. The plate 40 is attached to the upstream die block 20 over the width direction of the die coater 12. It is preferable that the plate 40 has a shape in which the distance between the top end portion and the lip face 18 is smaller at both ends than the center of the plate 40. The reason is to prevent the coating liquid from flowing to the outside in the web width direction of the die block by the surface tension or the like. In the central portion of the plate 40, the distance L between the top end portion and the lip face 18 is preferably in the range of 0 to 50 mm and the distance L is more preferably in the range of 0 to 20 mm.

Figure 3A:
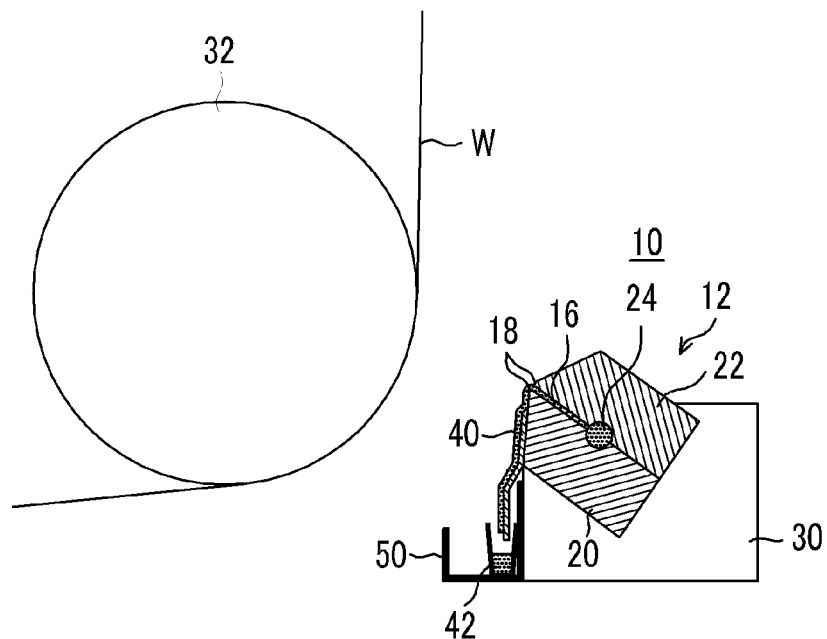
FIGS. 3A and 3B are diagrams schematically illustrating a coated film manufacturing method.
Figure 3B:
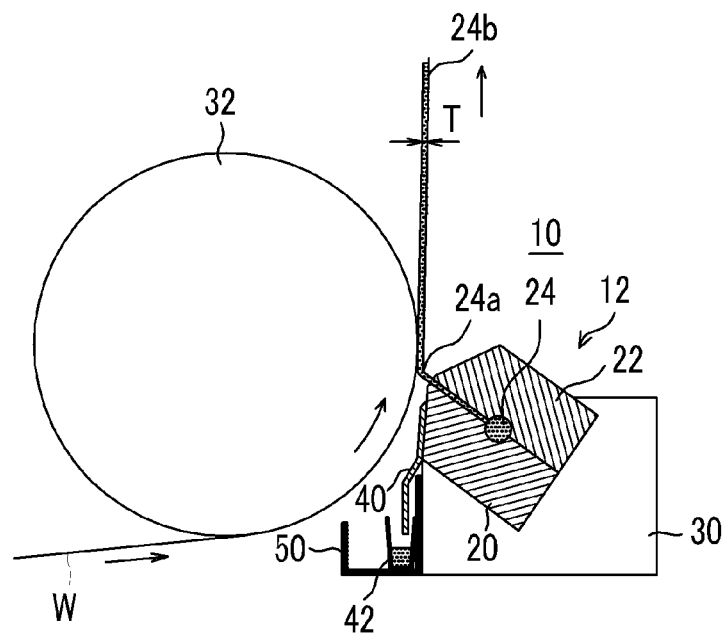

A coated film manufacturing method using the coating machine 10 will be described below with reference to FIGS. 3A and 3B.

The coating machine 10 is disposed in a trestle 30. The trestle 30 gets close to a web W or gets apart from the web W, that is, moves forward and backward, by the use of a moving mechanism not shown. The clearance between the web W and the coating machine 10 is adjusted by the use of the moving mechanism.

When a coating process is performed by the use of the coating machine 10, a preparatory work before coating is performed to stabilize the supply of a coating liquid. In the preparatory work before coating, that is, in a standby state, the coating machine 10 is arranged relative to the web W so that the clearance between the web W and the coating machine 10 is larger than the clearance at the time of coating, that is, a predetermined clearance. In the standby state, the coating liquid 24 is flowed from the die coater 12 until the coating liquid 24 can be stably supplied. The coating liquid 24 from the lip face 18 flows along the upstream die block 20 in the web conveying direction and reaches the plate 40. Since the top end portion of the plate 40 has a tapered shape, the coating liquid 24 flows to the bottom end along the plate 40. The coating liquid 24 is recovered in the container 42. The reservoir of the coating liquid 24 is not formed in the top end portion of the plate 40, because the top end portion has the tapered shape (FIG. 3A).

After the preparatory work before coating is finished so that the coating liquid can be stably supplied, the coating machine 10 moves forward until the clearance from the web W supported by a backup roller 32 becomes a predetermined clearance, for example, in the range of 0.03 to 0.15 mm. This movement means relative movement and thus the web W may get close to the coating machine 10. The web W is conveyed preferably at a speed in the range of 20 m/min to 100 m/min. The die coater 12 coats the continuously-traveling web W with the coating liquid 24 as a bead 24a. Accordingly, a coat 24b having a wet thickness T in the range of 0.1 µm to 10 µm is formed on the web W.

The reservoir of the coating liquid 24 is not formed in the top end portion of the plate 40. Therefore, it is possible to prevent a surface deficiency due to the scattering of the reservoir from occurring.

Figure 4:
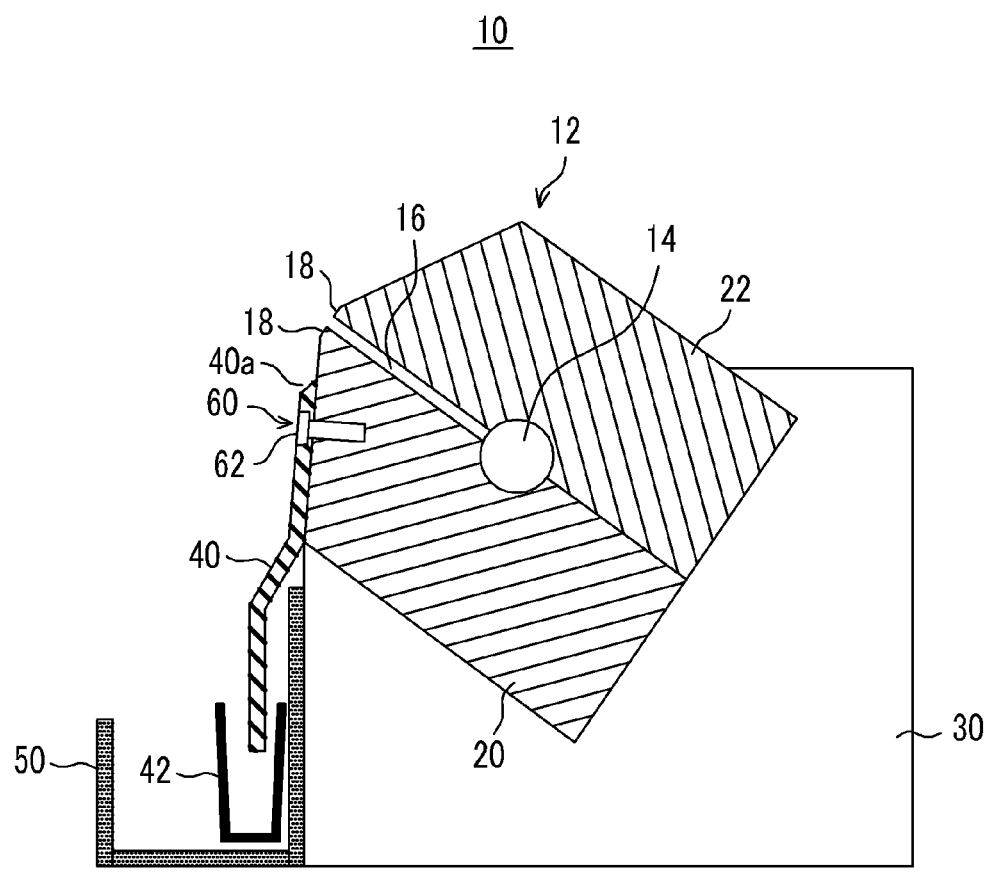
FIG. 4 is a diagram schematically illustrating the configuration of a coating machine according to another embodiment of the present invention.

FIG. 4 is a diagram schematically illustrating the configuration of a coating machine according to another embodiment of the present invention. The plate 40 is fixed to the upstream die block 20 with a screw 60. In this embodiment, since the head of the screw 60 is inserted into a concave portion of the plate 40, the head 62 of the screw 60 does not substantially protrude from the plate 40. Therefore, the reservoir due to the coating liquid 24 overflowing from the die coater 12 in the standby state is not formed in the head 62 of the screw 60. The top end portion 40a of the plate 40 has a shape in which the thickness of the plate gradually decreases upward. Therefore, since the reservoir is not scattered into the depressurizing chamber 50 when starting the coating, the surface deficiency of the web is suppressed from occurring. Although not shown, the plate 40 may be fixed to the upstream die block 20 by forming a convex portion in the plate 40 and inserting the convex portion into a concave portion of the upstream die block 20 formed at a position corresponding to the convex portion. In this case, since there is no portion corresponding to the head of the screw, a portion protruding from the plate 40 does not exist and thus the reservoir due to the coating liquid 24 overflowing from the die coater 12 is not formed.

Figure 5:
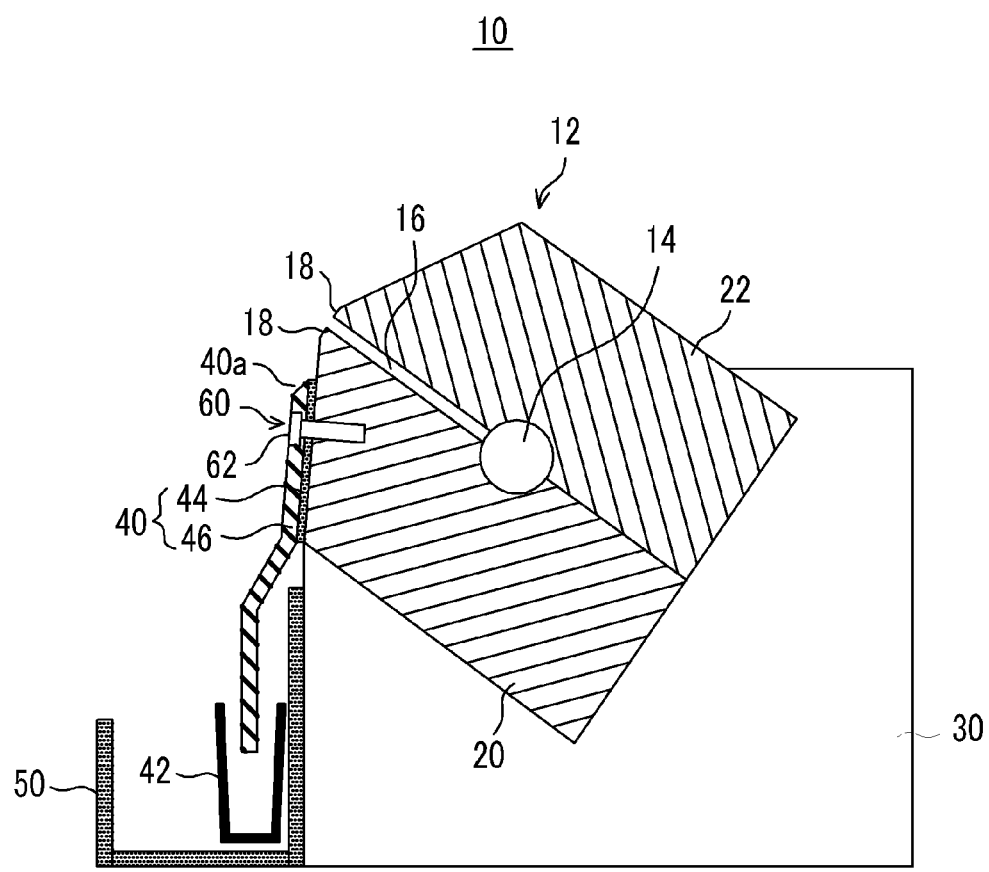
FIG. 5 is a diagram schematically illustrating the configuration of a coating machine according to another embodiment of the present invention.

FIG. 5 is a diagram schematically illustrating the configuration of a coating machine according to another embodiment of the present invention. The plate 40 includes a heat-insulating member 44 as the first plate and a rigid member 46 as the second plate. The heat-insulating member 44 and the rigid member 46 are disposed in the order of the heat-insulating member 44 and the rigid member 46 from the upstream die block 20. The plate 40 is fixed to the upstream die block 20 with a screw 60. The heat-insulating member 44 is formed of a material such as polytetrafluoroethylene (Teflon®) or Gore-Tex® obtained by compounding a polytetrafluoroethylene and a polyurethane polymer and has a thickness of 0.5 to 5 mm. The rigid member 46 is formed of stainless steel or superalloy and has a thickness of 0.5 to 2 mm and a modulus of rigidity of 10 to 100 GPa. Since the plate 40 includes the heat-insulating member 44 and the rigid member 46, high heat-insulating properties and high rigidity can be achieved by functional separation, thereby preventing the coating liquid from permeating the plate 40. In this case, since the modulus of rigidity of the rigid member 46 is greater than the modulus of rigidity of the heat-insulating member 44, the heat-insulating member 44 is closely attached to the upstream die block 20 with the screw 60. In this embodiment, the top end portion of the rigid member 46 has a tapered shape. The head 62 of the screw 60 does not substantially protrude from the plate 40.

The plate 40 prevents the coating liquid from coming in contact with the upstream die block 20. That is, it is possible to reduce the contact area between the coating liquid and the upstream die block 20. Since the top end portion 40a of the rigid member 46 has the tapered shape and the head 62 of the screw 60 does not substantially protrude from the plate 40, it is possible to prevent the formation of the reservoir of the coating liquid.

Figure 6:
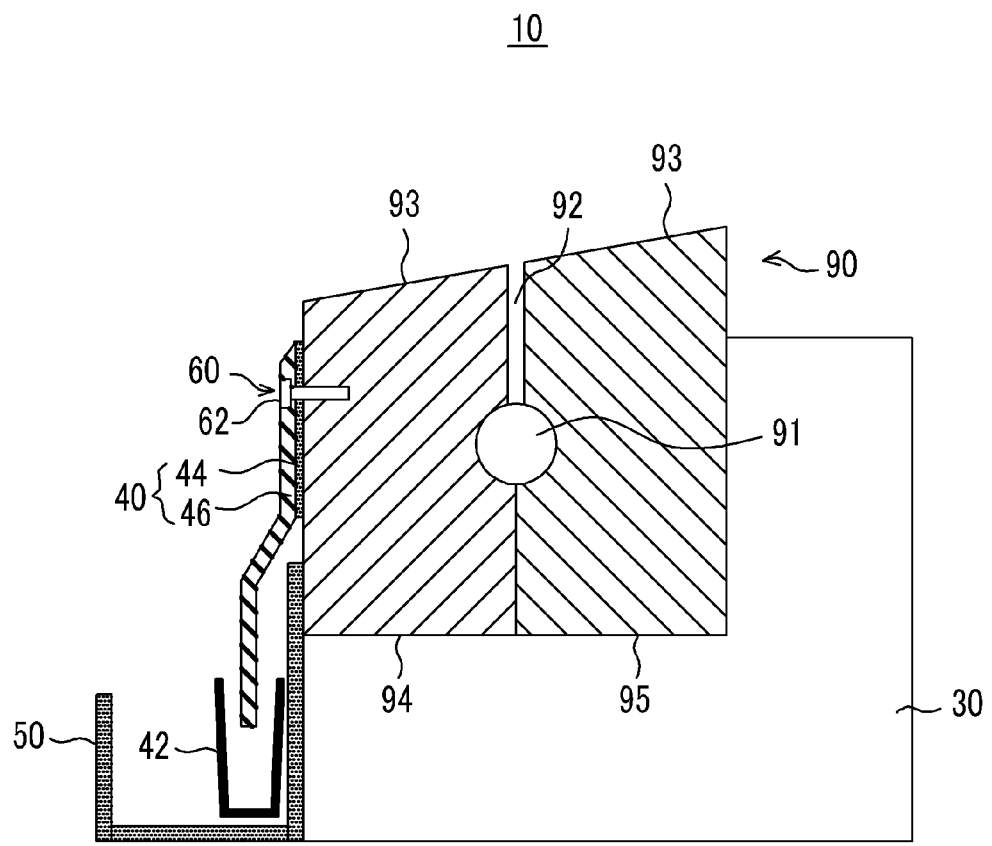
FIG. 6 is a diagram schematically illustrating the configuration of a coating machine according to another embodiment of the present invention.

FIG. 6 is a diagram schematically illustrating the configuration of a coating machine according to another embodiment of the present invention. The coating machine 10 includes a sliding die coater 90. The die coater 90 includes a manifold 91 disposed in a main body and a slot 92 communicating with the manifold 91. A lip face 93 (also referred to as a sliding face) is formed at an end of the slot 92. In the sliding die coater 90, a coating liquid flowed from the slot 92 flows down over the lip face 93. A bead is formed between a web and the coating liquid at the lower end of the lip face 93 at the time of coating and the coating liquid is supplied to the web.

The die coater 90 includes two blocks of an upstream die block 94 in the web conveying direction and a downstream die block 95 in the web conveying direction. The manifold 91 and the slot 92 are formed by disposing the upstream die block 94 in the web conveying direction and the downstream die block 95 in the web conveying direction having a cavity to face each other. In this way, by setting the die coater 90 to a multi-block structure, it is possible to enhance the processing precision of the die coater 90. The upstream die block 94 in the web conveying direction and the downstream die block 95 in the web conveying direction are formed of a material such as high-rigidity SUS. Such a material is used for the reason of high corrosion resistance and high processing precision. The upstream die block 94 in the web conveying direction and the downstream die block 95 in the web conveying direction may be formed in a body.

A heat-insulating plate 40 is fixed to the vicinity of the lip face 93 of the upstream die block 94 in the web conveying direction. The plate 40 has a length substantially equal to the length in the width direction of the die coater 90. The plate 40 prevents the coating liquid flowed from the slot 92 from coming in contact with the upstream die block 94 in the web conveying direction. The plate 40 has a heat-insulating property. Therefore, even when an organic solvent of the coating liquid attached to the plate 40 is evaporated, the plate 40 can prevent heat from being released from the upstream die block 94 in the web conveying direction. Accordingly, it is possible to suppress the variation in temperature of the die coater 90.

The plate 40 includes a heat-insulating member 44 and a rigid member 46, which are arranged in the order of the heat-insulating member 44 and the rigid member 46 from the upstream die block 94. The plate 40 is fixed to the upstream die block 94 with a screw 60. The top end portion of the rigid member 46 has a tapered shape. The head 62 of the screw 60 does not substantially protrude from the plate 40.

The plate 40 prevents the coating liquid from coming in contact with the upstream die block 94 in the web conveying direction. That is, it is possible to reduce the contact area between the coating liquid and the upstream die block 94 in the web conveying direction. Since the top end portion of the rigid member 46 has the tapered shape and the head 62 of the screw 60 does not substantially protrude from the plate 40, it is possible to prevent a reservoir of the coating liquid from being formed.

An organic-solvent coating liquid which should be applied with a low viscosity and a small thickness, such as a coating liquid for an optical compensating film, a coating liquid for an antireflection film, and a coating liquid for enlarging a viewing angle, can be suitably used as the coating liquid applied to the web W. For example, methyl ethyl ketone can be used.

Various known webs can be used as the web W. In general, examples thereof include various known plastic films such as polyethylene terephthalate, polyethylene-2,6-naphthalate, cellulose diacetate, cellulose triacetate, cellulose acetate propionate, polyvinyl chloriode, polyvinylidene chloride, polycarbonate, polyimide, and polyamide, various laminated sheets of paper such as paper and laminated paper in which α-polyolefins with a carbon number of 2 to 10, such as polyethylene, polypropylene, and ethylene butene copolymer, are stacked on the paper, webs in which a preliminary processing layer is formed on the surface of a band-like base such as a metal foil of aluminum, copper, tin, or the like, and various complex materials in which these are laminated.

Figure 7:
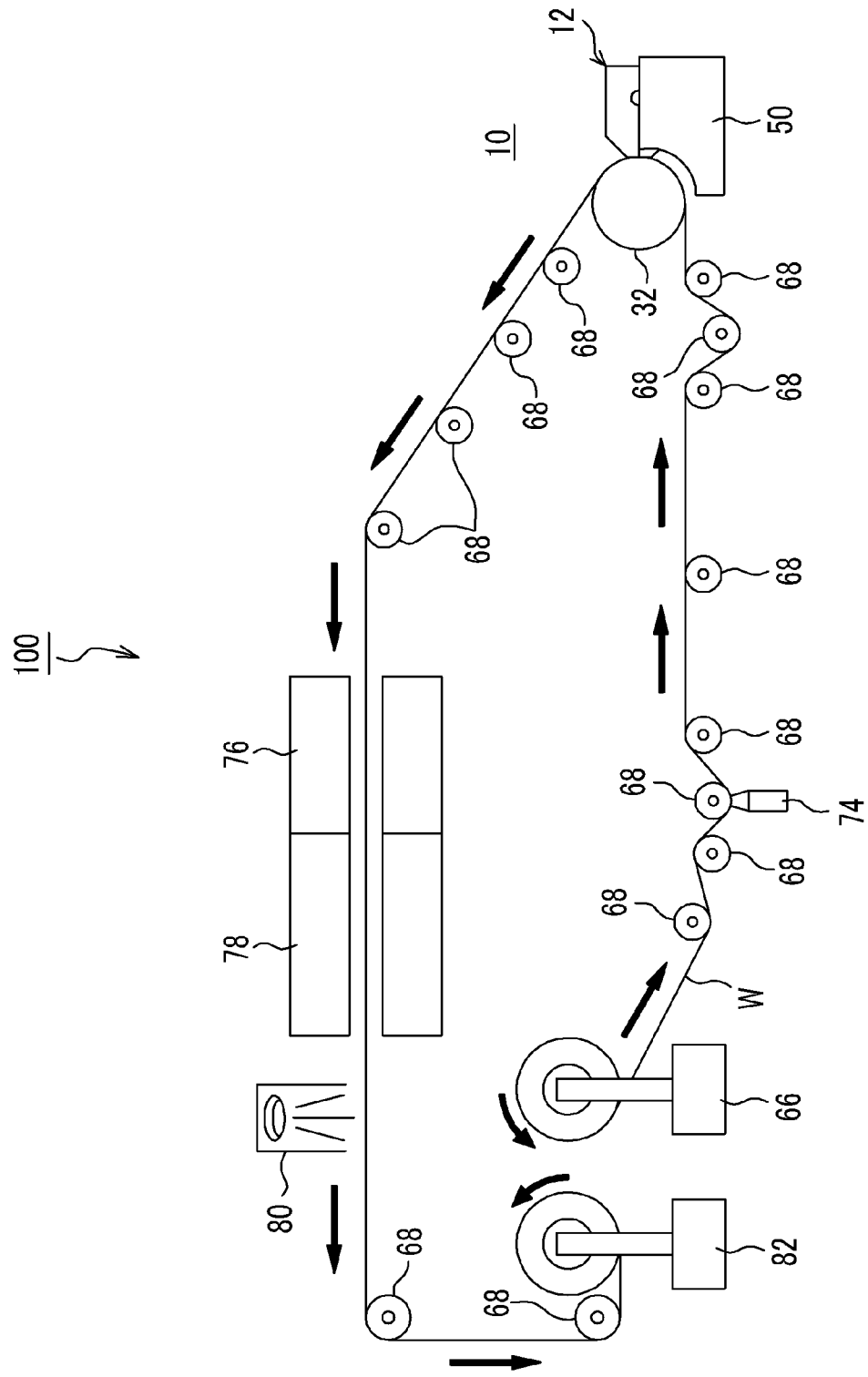
FIG. 7 is a diagram schematically illustrating the configuration of an optical film production line.

FIG. 7 is a diagram illustrating an example of a production line of an optical film which is a coated film. In the drawing, the arrow represents the traveling direction of a web W. Out of plural pass rollers 68 conveying the web W, only pass rollers 68 disposed at representative positions are shown.

In the production line 100 according to this embodiment, a unwinder 66, a dust collector 74, a backup roller 32, a coating machine 10, a dryer 76, a heater 78, a UV irradiation device 80, and a winder 82 are sequentially arranged from upstream to downstream.

The unwinder 66 sequentially supplies a web W which is a transparent support having a polymer layer formed in advance to the downstream. The dust collector 74 removes foreign substances such as particles attached to the web W.

The coating liquid is flowed from the die coater 12 to the web W conveyed and supported by the backup roller 32 to form a coat on the web W. A depressurizing chamber 50 is disposed upstream from the die coater 12. The depressurizing chamber 50 includes two side plates and a back plate. By depressurization using the depressurizing chamber 50, it is possible to precisely form a bead.

The drier 76 and the heater 78 form a zone in which the coat formed on the web W is dried. The drier 76 evaporates the solvent included in the coat. The heater 78 may be used to heat the web to remove the solvent or to harden the coat as needed.

It is preferable that the removal of the solvent using the drier 76 and the heater 78 is carried out in a state where they are covered with a cover. Rectified air or homogeneous air can be used as the drying air. The evaporated solvent may be condensed and removed by the use of a cold condensation plate disposed to face the coat surface.

The UV irradiation device 80 applies UV rays to the coat by the use of a UV lamp. Monomers or the like of the coat are cross-linked by the UV rays to form a desired polymer. The winder 82 winds and brings back the web W having a polymerized coat formed thereon in a roll shape.

A heating zone in which the coat is hardened by heat may be further provided depending on the components of the coat. In this case, the hardening and cross-linking of the coat may be performed as desired. In the process other than the production line 100, other processes such as heat treatment may be performed on the coat on the web W.

Plural pass rollers 68 are disposed between various devices. The web W is sent from upstream to downstream through the use of the pass rollers 68. The positions and number of the pass rollers 68, the distance between the rotation centers of the neighboring pass rollers 68, and the like are appropriately adjusted as needed.

The backup roller 32 and the pass rollers 68 serve as guide rollers conveying the web W. Other devices may be introduced into the production line 100 as needed. For example, as for an optical compensating film, a rubbing device adjusting the orientation of a liquid crystal portion of a coat may be disposed before or after the dust collector 74.

What is claimed is:

1. A coated film manufacturing method of supplying a coating liquid to a continuously-traveling web and manufacturing a coated film, the coated film manufacturing method comprising:
    a step of preparing a coating machine including (a) a die coater having a manifold to be supplied with the coating liquid, a slot communicating with the manifold, and a lip face formed at an end of the slot, (b) a heat-insulating plate being disposed in a region below the lip face of the die coater and having a top end portion in which the thickness of the heat-insulating plate gradually decreases upward, and (c) a depressurizing chamber being disposed upstream in a web conveying direction from the die coater;
    a step of causing the coating machine to stand by at a position for forming a clearance greater than a predetermined clearance between the coating machine and the web at the time of coating while flowing the coating liquid from the die coater; and
    a step of causing the coating machine to move to a position for forming the predetermined clearance, forming a bead between the web and the die coater, and supplying the coating liquid to the web to form a coat;
    wherein the top end portion of the plate has a tapered shape; and
    wherein the plate is fixed to the die coater by the use of a screw fixing the plate to the die coater and the screw has a shape that does not protrude from the plate after the plate is fixed to the die coater.

2. The coated film manufacturing method according to claim 1, wherein the plate has a convex portion, the die coater has a concave portion fitted into the convex portion, and the plate is fixed to the die coater by inserting the convex portion into the concave portion.

3. The coated film manufacturing method according to claim 1, wherein the plate is fixed to the die coater by the use of a fixing member fixing the plate to the die coater and the fixing member has a shape that does not protrude from the plate after the plate is fixed to the die coater.

4. The coated film manufacturing method according to claim 3, wherein the fixing member has such a shape to form a flat surface along with the plate after the plate is fixed to the die coater.

5. The coated film manufacturing method according to claim 3, wherein the plate has a diameter reduction hole, the die coater has a concave portion, and the fixing member has such a shape to be inserted into the hole and the concave portion to fix the plate to the die coater.

6. The coated film manufacturing method according to claim 4, wherein the plate has a diameter reduction hole, the die coater has a concave portion, and the fixing member has such a shape to be inserted into the hole and the concave portion to fix the plate to the die coater.

7. The coated film manufacturing method according to claim 1, wherein the plate has a modulus of rigidity of 10 GPa to 100 GPa.

8. The coated film manufacturing method according to claim 4, wherein the plate includes at least a first plate having a heat-insulating property and a second plate having a modulus of rigidity higher than that of the first plate.

9. The coated film manufacturing method according to claim 8, wherein the second plate has a modulus of rigidity of 10 GPa to 100 GPa.

10. The coated film manufacturing method according to claim 1, wherein the die coater is an extrusion type of die coater.

11. The coated film manufacturing method according to claim 1, wherein the die coater is a slide type of die coater.

12. The coated film manufacturing method according to claim 1, wherein the wet thickness of the coat is in the range of 0.1 μm to 10 μm.

13. The coated film manufacturing method according to claim 1, wherein the web is conveyed at a speed of 20 m/min or higher.

14. The coated film manufacturing method according to claim 1, further comprising a step of drying and curing the coat.

* * * * *